United States Patent [19]

Robinson et al.

[11] Patent Number: 5,472,083
[45] Date of Patent: Dec. 5, 1995

[54] COMPACT DISC CASE

[76] Inventors: Richard A. Robinson, 4349 Cedar Hurst Dr., Los Angeles, Calif. 90027-2106; Bruce Licher, P.O. Box 1033, Sedona, Ariz. 86339-1033

[21] Appl. No.: 291,015

[22] Filed: Aug. 15, 1994

[51] Int. Cl.⁶ .................................................. B65D 85/57
[52] U.S. Cl. .................................. 206/308.1; 229/87.01
[58] Field of Search ........................... 206/308.1, 308.3, 206/312, 313; 229/68 R, 72, 87.01

[56] References Cited

U.S. PATENT DOCUMENTS

| | | | |
|---|---|---|---|
| 3,717,297 | 2/1973 | Perry | 206/312 |
| 4,620,630 | 11/1986 | Moss | 206/308.1 |
| 4,709,812 | 12/1987 | Kosterka | 206/308.1 |
| 5,085,318 | 2/1992 | Leverick | 206/308.1 |
| 5,101,973 | 4/1992 | Martinez | 206/308.1 |
| 5,188,229 | 2/1993 | Bernstein | 206/312 |
| 5,248,032 | 9/1993 | Sheu et al. | 229/87.01 |
| 5,289,918 | 3/1994 | Dobias et al. | 206/312 |

*Primary Examiner*—Jimmy G. Foster
*Attorney, Agent, or Firm*—Erik M. Arnhem

[57] ABSTRACT

A case for holding a compact disc. The case has an inner sleeve portion having three folding panels, between which the compact disc is placed. The case also has a unitary envelope portion with (a) a slotted front panel with a vertical slot, (b) a slotted closure panel extending from one vertical side of the front panel, said closure panel having a horizontal slot formed therein, (c) a front tab panel extending from a vertical side of the closure panel not extending from the front panel, (d) a back panel extending from an upper, horizontal side of the slotted front panel, (e) a overlay panel extending from an upper, horizontal side of the back panel, and (f) a tabbed closure panel extending from an upper, horizontal side of the overlay panel. To make the case, the slotted front panel is folded over a front face of the back panel and the slotted closure panel is folded behind the back panel and the front tab panel is inserted into the vertical slot of the front slotted panel to thereby form a pocket into which the inner sleeve portion containing the compact disc is inserted. The overlay panel is then folded over the slotted front and its engaged front tab panel, and the tabbed closure panel is folded onto of the slotted closure panel and is inserted into the horizontal slot.

6 Claims, 2 Drawing Sheets

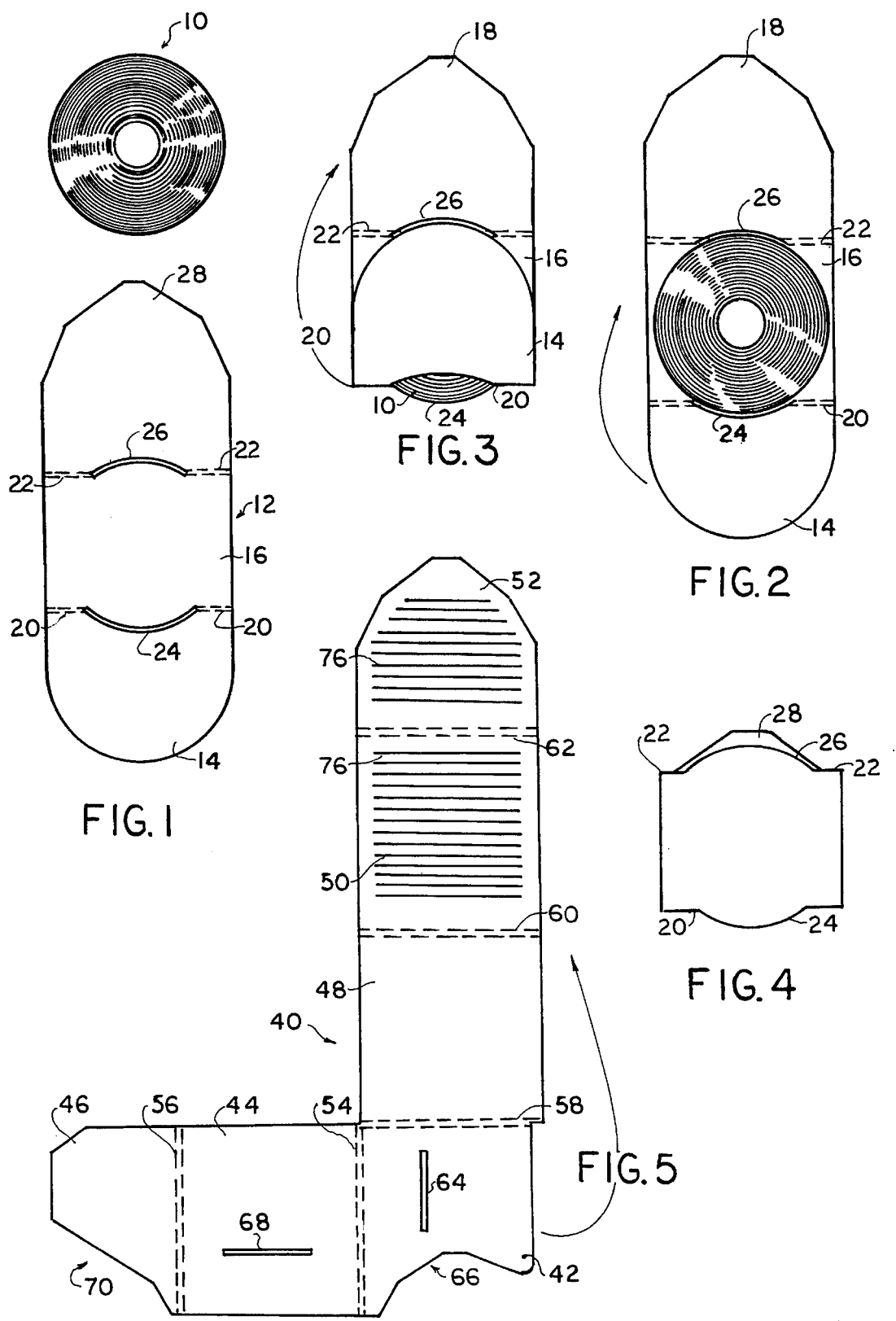

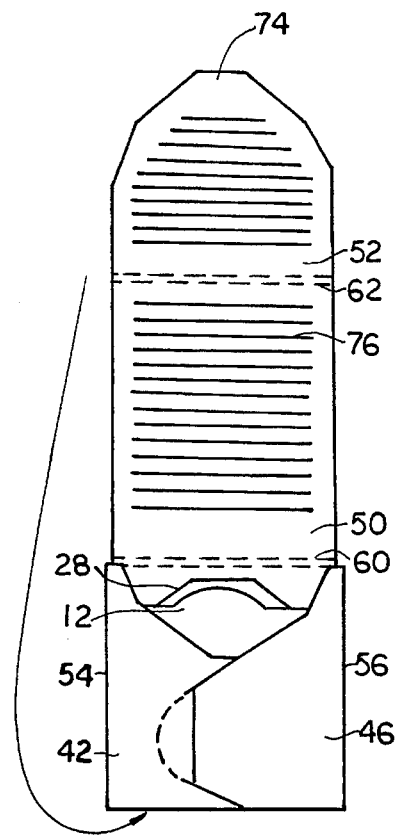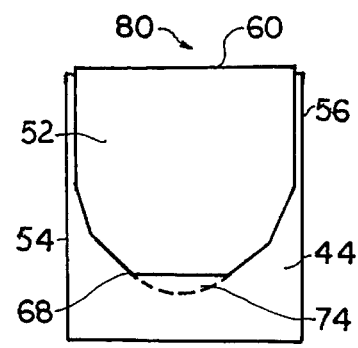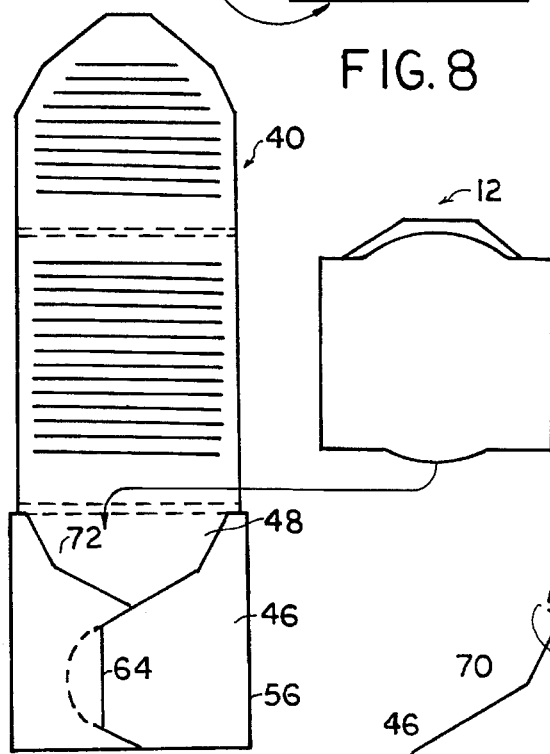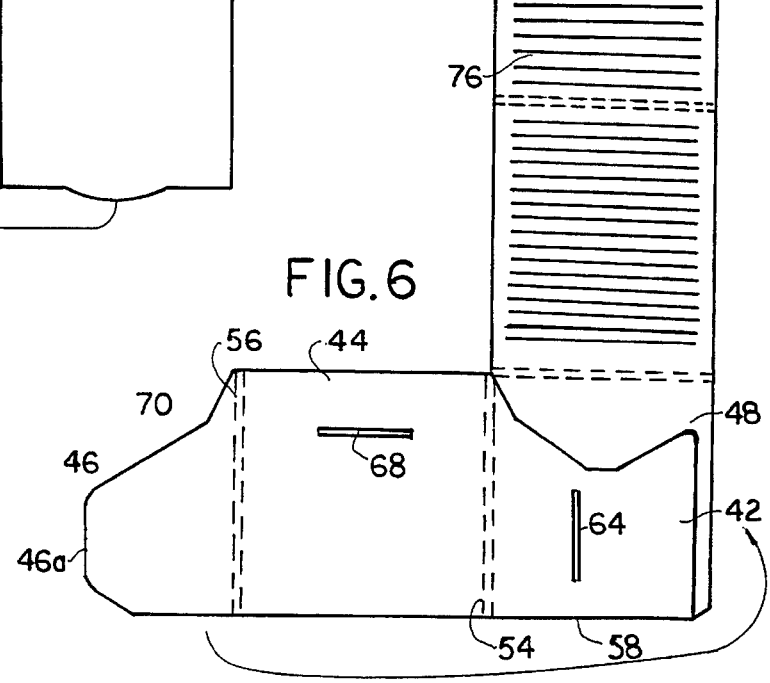

COMPACT DISC CASE

BACKGROUND OF THE INVENTION

1. Field of the Invention

This invention relates to the field of cases for compact discs, and more particularly to a case for a compact disc made solely of paper.

2. Description of the Prior Art

Since the advent of inexpensive compact disc players in the mid-1980's, the vinyl record has almost been totally replaced with the compact disc ("CD"), which is smaller, less susceptible to skipping and damage, and holds more "data" be it music, video, and/or text "data". The recent explosion of popularity of compact discs for computers has resulted in tremendous growth in CD production. Because of the relatively small size of CDs, at first, CDs were sold in long CD boxes, with the CD in a jewel box inside. However, these long CD boxes were, unlike the record sleeve of vinyl records, discarded upon opening the CD packaging, creating a tremendous volume of solid waste. Moreover, long cases were an inconvenient size for mailing. More recently, CD's are packaged and sold in jewel cases alone, with the CD snapped in a tray contained in the jewel case. The jewel case with tray and CD are in turn typically covered with shrink wrap plastic film, which is discarded when the jewel case is first opened. If the CD in its jewel case is to be mailed, a padded envelope or box is generally used due to the relatively brittle plastic used for the CD jewel case and tray. Upon receipt, the padded envelope will be discarded, again adding to the solid waste disposal problem. Another problem with CD jewel case is that they are generally made from virgin plastic material, not recycled materials.

There is accordingly a need for a case for a CD which protects the CD during storage, transportation, display and handling, and which is capable of being manufactured of recycled and recyclable materials, such as thick paper and paperboard stock.

SUMMARY OF THE INVENTION

The invention herein provides a case for holding a compact disc, comprising:

an inner sleeve portion having three folding panels, between which the compact disc is placed; and a unitary envelope portion comprising (a) a slotted front panel with a vertical slot, (b) a slotted closure panel extending from one vertical side of the slotted front panel, said closure panel having a horizontal slot formed therein, (c) a front tab panel extending from a vertical side of the closure panel not extending from the front panel, (d) a back panel extending from an upper, horizontal side of the slotted front panel, (e) a overlay panel extending from an upper, horizontal side of the back panel, and (f) a tabbed closure panel extending from an upper, horizontal side of the overlay panel; wherein the slotted front panel is folded over a front face of the back panel and the slotted closure panel is folded behind the back panel and the front tab panel is inserted into the vertical slot of the front slotted panel to thereby form a pocket into which the inner sleeve portion containing the compact disc is inserted, and wherein the overlay panel is folded over the slotted front and its engaged front tab panel, and the tabbed closure panel is folded onto of the slotted closure panel and is inserted into the horizontal slot, thereby securely retaining the CD in its sleeve in the envelope portion.

The invention herein further provides a case for holding a compact disc, comprising:

an inner sleeve portion comprising a lower panel with has a semi-circular end region, which is connected to a middle panel by a lower fold line which is partially intersected by a downwardly curved die cut line, and an upper panel connected to the middle panel by an upper fold line which is partially intersected by an upwardly curved die cut line, the compact disc fitting onto the middle panel between the lower and upper die cut lines, and extending outside of the confines of the lower and upper fold lines, such that when the compact disc is placed in the sleeve portion, the compact disc will be prevented from sliding from side-to-side therein;

a unitary envelope portion comprising (a) a slotted front panel with a vertical slot, (b) a slotted closure panel extending from one vertical side of the slotted front panel, said closure panel having a horizontal slot formed therein, (c) a front tab panel extending from a vertical side of the closure panel not extending from the front panel, (d) a back panel extending from an upper, horizontal side of the slotted front panel, (e) a overlay panel extending from an upper, horizontal side of the back panel, and (f) a tabbed closure panel extending from an upper, horizontal side of the overlay panel;

wherein the slotted front panel is folded over a front face of the back panel and the slotted closure panel is folded behind the back panel and the front tab panel is inserted into the vertical slot of the front slotted panel to thereby form a pocket into which the inner sleeve portion containing the compact disc is inserted, and wherein the overlay panel is folded over the slotted front and its engaged front tab panel, and the tabbed closure panel is folded onto of the slotted closure panel and is inserted into the horizontal slot and wherein the compact disc sleeve portion and the envelope portion are made from sheets of recycled paper.

BRIEF DESCRIPTION OF THE DRAWINGS

The invention is described below in greater detail with reference to the drawings.

FIG. 1 is a top view of a compact disc and the inner CD sleeve of the case.

FIG. 2 is a top view of the CD placed on the center panel of the sleeve.

FIG. 3 is a top view of the CD placed on the center panel of the sleeve with the lower panel folded over the CD.

FIG. 4 is a top view of the CD placed on the center panel of the sleeve with the lower panel folded over the CD, and upper panel folded over the lower panel, thereby securely retaining the CD therein.

FIG. 5 is a top view of the envelope portion of the case.

FIG. 6 is a top view of the envelope portion of the case with its lower panels folded over its back panel.

FIG. 7 is a top view of the envelope portion of the case with its slotted closure panel and front panel tab folded around the back panel and engaged with the front slotted panel, thereby creating a pocket for retention of CD carrying sleeve.

FIG. 8 is a top view of the sleeve with its contained CD placed in the pocket of the envelope portion of the case.

FIG. 9 is a rear view of the envelope portion of the case closed with the sleeve and its contained CD retained therein.

DETAILED DESCRIPTION OF THE INVENTION

Referring to FIG. 1, a compact disc ("CD") 10 is shown prior to being inserted into a CD sleeve 12 of the CD case of the invention. The CD sleeve 12 is formed from a single, unitary sheet of sheet material such as thick paper, paperboard and flexible but shape retaining plastic. The CD sleeve 12 has a lower panel 14, a middle panel 16, and an upper panel 18, which fold along fold lines 20 and 22. The sleeve portion's 10 lower panel 14 connects to the middle panel 16 along a lower fold line 20 which is partially intersected and bisected by a downwardly curved die cut line 24. The upper panel 18 connects to the middle panel 16 along an upper fold line 22 which is partially intersected and bisected by an upwardly curved die cut line 26. The lower panel 14 is semi-circular at its end, and is slightly larger than the diameter of a standard sized CD (about 12 centimeters.) The upper panel's 18 top region has a generally semi-octagonal shape, and has a pull-tab region 28. The CD 10 fits onto the middle panel 16 between the lower and upper die cut lines 24 and 26, and extends outside of the confines of the lower and upper fold lines 20 and 22, such that when the CD 10 is placed in the sleeve portion 12, the CD 10 will be prevented from sliding from side-to-side within the sleeve portion 12. This prevent possible damage to the side edges of the CD 10.

FIG. 2 shows the CD 10 placed on the middle panel 14, between the die cuts 24 and 26. FIG. 3 shows the lower panel 14 folded up over the CD 10 along fold lines 20 to overlay and sandwich the CD 10 between panels 14 and 16. The semicircular portion 24 protects the bottom portion of the CD. Referring to FIG. 4, the CD 10 and its sandwiched lower panel 14 and the upper panel 16 are folded along fold lines 22 to cover the upper panel 18. The CD 10 will thereby be completely enveloped.

Turning now to FIG. 5, the envelope portion 40 of the CD case is shown in its unfolded state. It has six panels 42, 44, 46, 48, 50 and 52, and five double fold lines 54, 56, 58, 60, and 62. Like the sleeve portion, the envelope portion 40 is a unitary portion and is made from a single sheet of sheet material, such as thick, recycled paper, paperboard, or plastic. The front slotted panel 42 is connected via vertical double fold lines 54 to slotted closure panel 44. Slotted closure panel 44 is in turn connected by vertical double fold lines 56 to front panel tab 46. The front slotted panel 42 is connected by horizontal double fold lines 58 to back panel 48. Back panel 48 is connected at an upper horizontal edge via double fold lines 60 to overlay panel 50. Lastly, the overlay panel 50 is connected via horizontal double fold lines 62 to closure tab 52. The front slotted panel has a vertical pocket slot 64, and has a generally V-shaped cut-out mouth region 66. The slotted closure panel 44 has a horizontal closure slot 68 formed therein. The front panel tab 46 has a slant cut lower region 70.

Referring now to FIG. 6, the front slotted panel 42 is folded along the double fold lines 58 to overlay the back panel 48. The slotted closure panel 44 is folded upwardly along double fold lines 54 and the front panel tab 46 is folded rearwardly along double fold lines 56, and the end 46a of the front panel tab 46 is inserted into to vertical pocket slot 64. Referring to FIG. 7, folded and assembled as described, an opened mouth pocket is created, defined by fold lines 58 at the bottom, fold lines 54 on the left side, and fold lines 56 on the right side. The overlapping V-shaped cut-out mouth region 66 and slant lower cut 70 define a generally V-shaped mouth 72. The CD sleeve 12 and its contained CD 10 are slipped into the pocket through the mouth 72, as shown in FIG. 8.

Referring to FIGS. 8 and 9, the overlay panel 50 is folded forwardly along double fold lines 60 to cover the CD sleeve 12 retained in the pocket of the envelope 40, and the tabbed closure panel 52 is folded forwardly along double fold lines 62 to cover the slotted closure panel 44. The end region 74 of the tabbed closure panel 52 is inserted into the horizontal closure slot 68 in the slotted closure panel 44, thereby positively closing the CD sleeve 12 in the envelope 40. The CD case 80 of the invention thus comprises the inner CD containing sleeve 12 and the envelope 40. To remove a CD from the case 80, a user need only detach the end region 74 from the horizontal closure 68 slot, and fold back the tabbed closure panel 52 and overlay panel 50 to open the mouth of the envelope 40, and grasp the pulling tab 28 and pull out the CD sleeve 12, and remove the CD 10.

The CD sleeve 10 and envelope 40 can be die cut from a single sheet of paperboard. Recycled paperboard functions well in the construction the CD case of the invention. Other materials, such as stiff but foldable plastic sheet material which holds a crease may also be used to construct the CD case of the invention. The inventor uses double fold lines because the CD 10 containing sleeve 12 and folded envelope 40 have thickness, and double fold lines accommodate this thickness favorably. Single fold lines would also work, although less well. Printing 76 can be placed desired panels of the envelope 40. In particular, panels 50 and 52 provide an ideal place to place written indicia. Written indicia can also be placed on the CD sleeve portion 12 and on other panels of the envelope 40.

The drawings and the foregoing description are not intended to represent the only form of the invention in regard to the details of this construction and manner of operation. In fact, it will be evident to one skilled in the art that modifications and variations may be made without departing from the spirit and scope of the invention. Although specific terms have been employed, they are intended in a generic and descriptive sense only and not for the purpose of limitation, the scope of the invention being delineated in the following the claims which follow.

We claim:

1. A case for holding a compact disc, comprising:

an inner sleeve portion having three folding panels, between which the compact disc is placed; and a unitary envelope portion comprising (a) a slotted front panel with a vertical slot, (b) a slotted closure panel extending from one vertical side of the slotted front panel, said closure panel having a horizontal slot formed therein, (c) a front tab panel extending from a vertical side of the closure panel not extending from the front panel, (d) a back panel extending from an upper, horizontal side of the slotted front panel, (e) a overlay panel extending from an upper, horizontal side of the back panel, and (f) a tabbed closure panel extending from an upper, horizontal side of the overlay panel; wherein the slotted front panel is folded over a front face of the back panel and the slotted closure panel is folded behind the back panel and the front tab panel is inserted into the vertical slot of the front slotted panel to thereby form a pocket into which the inner sleeve portion containing the compact disc is inserted, and wherein the overlay panel is folded over the slotted front and its engaged front tab panel, and the tabbed closure panel is folded onto of the slotted closure panel and is inserted into the horizontal slot, thereby securely retaining the compact disc in its sleeve portion in the envelope portion.

2. The case for holding compact discs of claim 1, wherein the compact disc sleeve portion and the envelope portion are formed from recycled paper.

3. The case for holding compact discs of claim 1, wherein the compact disc sleeve portion and the envelope portion are unitary and are formed from single sheets of material.

4. The case for holding compact discs of claim 1, wherein the compact disc sleeve portion and envelope portion are folded along double fold lines.

5. The case for holding compact discs of claim 1, wherein the compact disc sleeve portion comprises a lower panel which has a semi-circular end region, which is connected to a middle panel by a lower fold line which is partially intersected by a downwardly curved die cut line, and an upper panel connected to the middle panel by an upper fold line which is partially intersected by an upwardly curved die cut line, the compact disc thus fitting onto the middle panel between the lower and upper die cut lines, and extending outside of the confines of the lower and upper fold lines, such that when the compact disc is placed in the sleeve portion, the compact disc will be prevented from sliding from side-to-side therein.

6. A case for holding a compact disc, comprising:

an inner sleeve portion comprising a lower panel with has a semi-circular end region, which is connected to a middle panel by a lower fold line which is partially intersected by a downwardly curved die cut line, and an upper panel connected to the middle panel by an upper fold line which is partially intersected by an upwardly curved die cut line, the compact disc fitting onto the middle panel between the lower and upper die cut lines, and extending outside of the confines of the lower and upper fold lines, such that when the compact disc is placed in the sleeve portion, the compact disc will be prevented from sliding from side-to-side therein;

a unitary envelope portion comprising (a) a slotted front panel with a vertical slot, (b) a slotted closure panel extending from one vertical side of the slotted front panel, said closure panel having a horizontal slot formed therein, (c) a front tab panel extending from a vertical side of the closure panel not extending from the front panel, (d) a back panel extending from an upper, horizontal side of the slotted front panel, (e) a overlay panel extending from an upper, horizontal side of the back panel, and (f) a tabbed closure panel extending from an upper, horizontal side of the overlay panel;

wherein the slotted front panel is folded over a front face of the back panel and the slotted closure panel is folded behind the back panel and the front tab panel is inserted into the vertical slot of the front slotted panel to thereby form a pocket into which the inner sleeve portion containing the compact disc is inserted, and wherein the overlay panel is folded over the slotted front and its engaged front tab panel, and the tabbed closure panel is folded onto of the slotted closure panel and is inserted into the horizontal slot and wherein the compact disc sleeve portion and the envelope portion are made from sheets of recycled paper.

* * * * *